US010666790B2

(12) United States Patent
Ehlen et al.

(10) Patent No.: US 10,666,790 B2
(45) Date of Patent: May 26, 2020

(54) COMMUNICATIONS TECHNIQUES

(71) Applicant: VODAFONE IP LICENSING LIMITED, Newbury, Berkshire (GB)

(72) Inventors: Ingo Ehlen, London (GB); Domenico Idone, London (GB); Maria-Beatriz Lopez-Mencia, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/114,738

(22) PCT Filed: Jan. 27, 2015

(86) PCT No.: PCT/EP2015/051579
§ 371 (c)(1),
(2) Date: Jul. 27, 2016

(87) PCT Pub. No.: WO2015/110651
PCT Pub. Date: Jul. 30, 2015

(65) Prior Publication Data
US 2016/0344863 A1 Nov. 24, 2016

(30) Foreign Application Priority Data
Jan. 27, 2014 (GB) .................... 1401390.9

(51) Int. Cl.
*H04M 3/22* (2006.01)
*H04M 1/57* (2006.01)
(Continued)

(52) U.S. Cl.
CPC ......... *H04M 3/2218* (2013.01); *H04M 1/575* (2013.01); *H04M 1/72583* (2013.01);
(Continued)

(58) Field of Classification Search
CPC ....... H04W 76/02; H04W 88/06; H04W 8/26; H04W 48/16; H04L 63/123;
(Continued)

(56) References Cited

U.S. PATENT DOCUMENTS

2003/0112928 A1* 6/2003 Brown ................ H04M 3/2218
379/67.1
2005/0243982 A1 11/2005 Starbuck et al.
(Continued)

FOREIGN PATENT DOCUMENTS

EP 0 924 917 A2 6/1999
EP 1 898 615 A2 3/2008
(Continued)

OTHER PUBLICATIONS

International Search Report for PCT/EP2015/051579 dated Dec. 5, 2015.
Search Report issued in GB1401390.8 dated May 20, 2014.

*Primary Examiner* — Yemane Mesfin
*Assistant Examiner* — Mon Cheri S Davenport
(74) *Attorney, Agent, or Firm* — Workman Nydegger

(57) ABSTRACT

Disclosed herein is a method of generating a record of a call, the method, performed by a first device, comprising: performing a voice communications call with a second electronic device over a first communications channel; receiving and/or transmitting, during the voice communications call, call content data over a second communications channel; generating call details in dependence on the voice communications call; and generating a record of the call, wherein the record comprises the call details stored in association with the call content data. Advantageously, each generated call record provides an entry point to access data or to search information related to each call.

15 Claims, 7 Drawing Sheets

(51) Int. Cl.
*H04M 15/00* (2006.01)
*H04M 3/42* (2006.01)
*H04M 1/725* (2006.01)
*H04M 11/06* (2006.01)
H04M 15/28 (2006.01)
H04M 7/00 (2006.01)
H04M 7/12 (2006.01)

(52) U.S. Cl.
CPC ..... *H04M 3/42042* (2013.01); *H04M 11/062* (2013.01); *H04M 15/44* (2013.01); *H04M 1/72519* (2013.01); *H04M 3/42059* (2013.01); *H04M 7/0039* (2013.01); *H04M 7/0057* (2013.01); *H04M 7/123* (2013.01); *H04M 15/28* (2013.01); *H04M 15/58* (2013.01); *H04M 2203/2011* (2013.01); *H04M 2203/2038* (2013.01); *H04M 2203/551* (2013.01); *H04M 2250/60* (2013.01)

(58) Field of Classification Search
CPC ...... H04L 65/4007; H04L 63/03; H04M 3/22; H04M 7/0078; H04M 15/57; H04M 15/58; H04M 1/72519; H04M 1/72583; H04M 2203/2011; H04M 2203/2038; H04M 2203/551; H04M 2215/208; H04M 2250/60; H04M 3/2218; H04M 3/42042; H04M 3/4231; H04M 3/48; H04M 3/487; H04M 3/493; H04M 3/5166; H04M 7/0039; H04M 7/128; H04Q 3/72; H04Q 2213/1307; H04Q 2213/13109; H04Q 2213/13248
See application file for complete search history.

(56) References Cited

U.S. PATENT DOCUMENTS

| 2006/0227956 | A1 | 10/2006 | Pearson | |
|---|---|---|---|---|
| 2010/0151839 | A1 | 6/2010 | Krishnamurthy | |
| 2010/0215161 | A1 | 8/2010 | Baccay | |
| 2012/0069984 | A1* | 3/2012 | Sylvain | 379/216.01 |
| 2013/0054517 | A1* | 2/2013 | Beechuk | G06Q 50/01 |
| | | | | 707/609 |
| 2014/0108568 | A1* | 4/2014 | Lee | H04L 12/1818 |
| | | | | 709/206 |

FOREIGN PATENT DOCUMENTS

| EP | 2 073 517 A1 | 6/2009 |
|---|---|---|
| EP | 2 487 881 A1 | 8/2012 |
| EP | 2 571 236 A1 | 3/2013 |
| WO | 01-41457 A2 | 6/2001 |
| WO | 2007134623 A1 | 11/2007 |
| WO | 2015-008232 A1 | 1/2015 |

* cited by examiner

COMMUNICATIONS TECHNIQUES

CROSS REFERENCE TO RELATED APPLICATIONS

This application is a U.S. Nationalization of PCT Application Number PCT/EP2015/051579, filed on Jan. 27, 2015, which claims priority to GB Patent Application No. 1401390.9, filed on Jan. 27, 2014, the entireties of which are incorporated herein by reference.

FIELD OF THE INVENTION

This invention relates to methods and apparatus for generating a record of a call between a first device and a second device over a first communications channel, the record including call content data received and/or transmitted between the first and second devices over a second communications channel.

BACKGROUND OF THE INVENTION

The processes by which a user of a mobile telephone makes a call are well established.

In order to start a call, a calling party enters, or selects from a contact list, a telephone number of a called party that the calling party would like to call. The telephone of the calling party then generates and transmits a call request to a telephone of the called party. The called party then receives the call and the call request will either be accepted or the request will fail. If the request is accepted, then the called and calling parties can talk to each other over a voice communications call. If the request fails, then a voice communication call is not established. A request may fail for a number of reasons, such as the called telephone being engaged, the called party being away from their telephone, the called party being out of reach (i.e. in an area without mobile signal coverage) or the called party actively rejecting the call request. After a call request has failed, the calling party is usually then provided with the option of leaving a voicemail message. The called party is then informed, by a text message, that a voicemail message has been left for them. The called party can then call their voicemail number to listen to the message. Alternatively, or in addition, to leaving a voicemail message, the calling party may send the called party a text message. For both accepted and failed requests, call records are generated by the telephones of the calling and called parties that comprise details of the call. A call log is stored on each telephone that comprises the call records resulting from a plurality of accepted and failed call requests that each party has had. The stored details in each record typically consist of a telephone number and the time, date and, for each accepted request, the duration of the call.

A number of problems exist with the above-described known processes.

The calling party has no way of influencing how a received call request is seen by a called party. A called party may, for example, decide to actively reject a received call request because was currently in a meeting. This would be appropriate for a call regarding a matter of minor importance, such as a request from his wife to buy some bread on his way home. However, for a matter of high importance, such as their child has been involved in an accident, then refusing the call would not be appropriate. The calling party, however, has no way of providing any indication of the nature, reason, or importance, of a call when sending a call request.

When a call request has failed, the called party will see a missed call notification displayed on their telephone. The called party may also have received a notification that they have received a voicemail message and/or text message from the called party. However, the calling party has no way of providing any indication of the nature, reason, or importance, of the call that was missed. Accordingly, to gain this information, the called party has to call their voicemail and, among all of their messages, find the right voicemail message to listen to before knowing if that missed call was important or not. If a text message has been received, then this is mixed in with any other text messages that have been received and the called party has to read through all of the text messages before determining if anything important has occurred.

In addition, the data stored in call logs is very limited. When viewing a call record, the called party can only determine when the call took place and who the call was with. The called party is not reminded of what the call was about, why the call occurred, where the call took place and any further information that would be of assistance to the called party.

Accordingly, there is a general need to improve the above-discussed known processes to improve the experiences of both called and calling parties.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus are described for generating a record of a call, the method comprising a first device: performing a voice communications call with a second electronic device over a first communications channel; receiving and/or transmitting, during the voice communications call, call content data over a second communications channel; generating call details in dependence on the voice communications call; and generating a record of the call, wherein the record comprises the call details stored in association with the call content data.

According to a first aspect of the invention, there is provided a method of generating a record of a call between a first device and a second device, the method, being performed by the first device, comprising: performing a voice communications call with a second device over a first communications channel; at least one of receiving, transmitting, or receiving and transmitting, during the voice communications call, call content data over a second communications channel; generating call details in dependence on the voice communications call; and generating a record of the call, wherein the record comprises the call details stored in association with the call content data.

Preferably, the call details comprise one or more of the time, date and duration of the call and the number of the second device (e.g. second electronic device).

Preferably, the call content data comprises one or more of: an indication of the importance, subject or reason for the call; location data; images; and any other data or media.

Preferably, the call content data is stored on the first device (e.g. a first electronic device).

Preferably, the call content data is stored at a remote location from the first device (e.g. first electronic device).

Preferably the method further comprises: generating a call log comprising a plurality of call records; and displaying the call log on the first device (e.g. first electronic device); wherein the call records of the call log are displayed as selectable items such that a user of the first device is able to select a call record and thereby obtain both the call details and the call content data.

Preferably, the first channel is either a circuit switched channel or a packet switched channel.

Preferably, the second channel is either a circuit switched channel or a packet switched channel.

Preferably, the first channel is a circuit switched channel and the second channel is a packet switched channel.

Preferably, the first and second channels are provided by Rich Communications Suite, RCS.

Preferably, performing the voice communications call with the second device over a first communications channel further comprises transmitting, from the first device to the second device, an enhanced call request comprising a call request and call data, where the record comprises the call details stored in association with the call request and call data.

Preferably, the call request is transmitted over the first channel and the call data is transmitted over the second channel, the first channel being different to the second channel.

Preferably, performing the voice communications call with the second device further comprises, before placing the voice communications call, inputting additional data representative of the call data, the additional data comprising one or more of: the importance of the call; one or more of subject, reason, or context of the call; a location; or an image.

According to a second aspect of the invention, there is provided a mobile telephone configured to perform any of the above-described the methods.

Preferably, the mobile telephone may include a memory unit, a processor unit, and a communication interface, the processor unit coupled to the memory unit, and the communication interface, where the memory unit comprises instructions stored thereon, which when executed on the processor unit, causes the mobile telephone to perform a method comprising: performing, by the processor unit and communication interface, a voice communications call with a second device over a first communications channel; at least one of receiving, transmitting, or receiving and transmitting (e.g. receiving and/or transmitted), by the communication interface during the voice communications call, call content data over a second communications channel; generating, by the processor unit, call details in dependence on the voice communications call; and generating, by the processor unit, a record of the call, wherein the record comprises the call details stored in association with the call content data.

Preferably, the memory unit further comprises instructions stored thereon, which when executed on the processor unit, causes the mobile telephone to perform the method according to any one of the above-described methods or the methods described herein.

The methods described herein may be performed by software in machine readable form on a tangible storage medium e.g. in the form of a computer program comprising computer program code means adapted to perform all the steps of any of the methods described herein when the program is run on a processor and where the computer program may be embodied on a computer readable medium. Examples of tangible (or non-transitory) computer readable medium or storage media include memory units, hard disk drives, disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

According to another aspect of the invention, there is provided a tangible computer readable medium comprising computer program code to configure a first device to perform a method comprising: performing a voice communications call with a second device over a first communications channel; at least one of receiving, transmitting, or receiving and transmitting (e.g. receiving and/or transmitting), during the voice communications call, call content data over a second communications channel; generating call details in dependence on the voice communications call; and generating a record of the call, wherein the record comprises the call details stored in association with the call content data.

Preferably, the tangible computer readable medium further comprising computer program code to configure the first device to perform the method according to any one of the above-described methods or the methods as described herein.

The preferred features may be combined as appropriate, as would be apparent to a skilled person, and may be combined with any of the aspects of the invention.

DETAILED DESCRIPTION OF THE DRAWINGS

Embodiments of the present invention are discussed below, by way of example only, with reference to the accompanying drawings, in which.

Figure 1A:
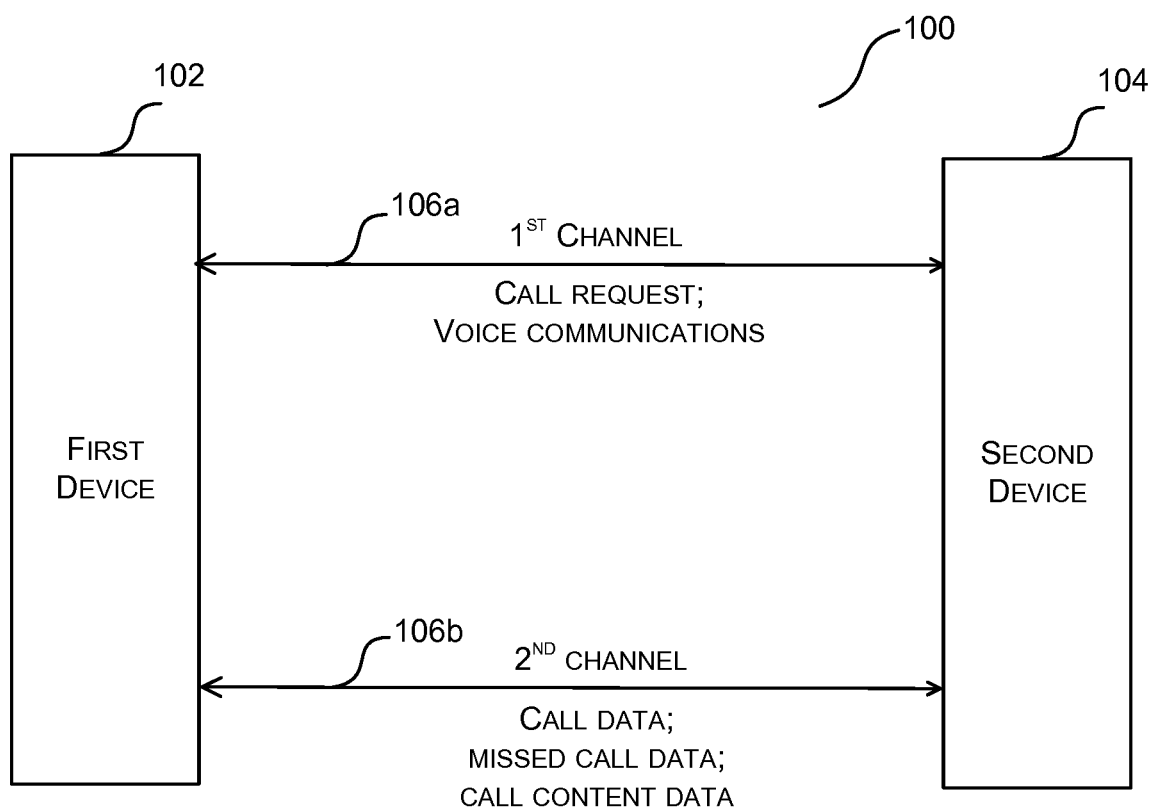
FIG. 1a shows first and second communication channels between first and second devices according to embodiments.

Common reference numerals are used throughout the figures to indicate similar features.

It will also be appreciated that although features from each of the embodiments may be identified by different reference numerals in the figures and throughout the description, similar features including the properties and functionality attributed thereto, from one embodiment may be interchangeable with those of another embodiment.

DETAILED DESCRIPTION

Embodiments of the invention solve at least some of the above-described problems experienced by called and calling parties. It is to be appreciated by the skilled person that embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example(s). However, the same or equivalent functions and sequences may be accomplished by different examples.

References in the specification to "one embodiment," "an embodiment," "an example embodiment," "first embodiment," "second embodiment," "third embodiment," or the like, indicate that the embodiment described may include a particular feature, structure, or characteristic, but every embodiment may not necessarily include the particular feature, structure, or characteristic. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

According to a first embodiment, a calling party is provided with a way of indicating the relevance, importance, or nature of a call request that is sent to a called party. When a call request is received by the called party, their telephone displays not only an indication that a call request has been received but also further data that allows the called party to make a more informed decision on whether or not to answer the call.

According to the first embodiment, a calling party determines a number to be called, for example by selecting it from a contact list. Before placing a call (i.e. pressing the call button on their telephone), the calling party inputs, via a user interface of their telephone, additional data that is referred to herein as call data. The call data is transmitted to the called party at the same time as the call request. At the called party's telephone, a display of the call request is generated in dependence on a combination of the received call request and the received call data. The display of the call request is therefore enhanced by the call data and the called party is able to make a more informed decision regarding whether or not to accept the call request in that moment.

The call data may provide an indication of one or more of the following:

a) Importance/urgency of the call

The calling party sets a status of the call as important. The called party will see that this call has been marked as 'important' by the caller, for example a red flag may be provided next to the displayed call request.

b) Subject/reason/context of the call

The calling party writes some text that appears on the called party's incoming call screen. Before answering the call, the called party can read a note sent by the calling party and thereby make a more informed decision about whether or not to answer the call.

c) A Location

The calling party sends a location as pin on a map. This may be the calling party's current location, as automatically determined by the calling party's telephone, or any other location that can be found with an electronic map application. The called party is provided with this location information on the incoming call screen before deciding to answer or reject the call.

d) A Photo/Image

The calling party sends an image, such as a photo from a gallery stored on the telephone or took on the moment of making the call. The called party sees the image on the incoming call screen before deciding to answer or reject the call.

The call data and call request are transmitted from the calling party's telephone to the called party's telephone over different channels. The call request, and resulting voice call if the call the request is accepted, are made over a first channel. The first channel may be either circuit switched (in case of normal circuit switching (CS) call) or packet switched (PS) (e.g. Voice over Long Term Evolution (LTE) or Video over LTE calls if the user is under LTE coverage or Rich Communications Suite (RCS) VoIP calls in case the user is under Wi-Fi or High Speed Packet Access (HSPA) coverage). The call data is sent, in parallel to the call request, over a second channel that is packet switched.

FIG. 1a shows a configuration for supporting communications between first and second devices 102 and 104, respectively, over parallel first and second communication channels 106a and 106b, respectively. The first device 102 may be the device of the calling party (e.g. calling party's telephone) and the second device 104 that of the called party (e.g. called party's telephone). Although not shown in FIG. 1a, the first and second channels 106a and 106b between the first and second devices 102 and 104 would be provided by any network suitable for supporting circuit or packet switched communications.

The call request and call data are both transmitted from the calling party's telephone (e.g. first device 102) in a way that the called party's telephone (e.g. second device 104) is able to determine that the call data corresponds to the call request. For example, a call request identifier may be generated by the calling party's telephone 102 and included in both the call request and the call data. The called party's telephone 104 is therefore able to determine that a received call request over the first channel 106a and received call data over the second channel 106b correspond to an enhanced call request sent by the calling party. The called party's telephone 104 therefore automatically uses the call data to generate and display an enhanced call request. The second channel 106b may be a dedicated channel and preferably provides the call data in advance of the call request being received so that the only generated call request is an enhanced call request.

Advantageously, the calling party is able to add information about the call he is about to make and this is received by the called party together with the incoming call notification. The called party, together with the standard accept/reject options available on incoming call screen, sees the additional information sent by the caller on the same incoming call screen. The information sent by the caller can be of any type: importance flag, text note, a location, a picture. The added information makes the call request more relevant to the called party by proving context, expressing the reason for the call, and creating interest about the call. The called party can therefore make a better decision about whether or not to accept the call request in that moment.

According to a second embodiment, a calling party is provided with a way of indicating the relevance, importance, or nature of a missed call by enriching its notification that is displayed on the telephone of a called party after a call request has failed. The missed call notification not only informs the called party that they have missed a call but also provides further data that that informs the called party of the nature, importance or reason of the call attempt from the calling party.

According to the second embodiment, the telephone of a calling party (e.g. first device 102) sends a call request to a called party. The call request fails, for example because the called telephone (e.g. second device 104) was engaged, the called party was away from their telephone 104, the called party actively rejected the call request or it was not possible to establish communications with the called party's telephone 104 due to the called party being out of reach (i.e. in an area without mobile signal coverage). The calling party's telephone 102 then determines that the call request failed and immediately provides a prompt on its user interface for the calling party to input additional data that is referred to herein as missed call data.

In response to receiving the prompt, the calling party may do one, or both, of:
a) Leave a call note
   The calling party writes some text data related to that failed call attempt to express the reason of that call or to express the urgency/need of getting in touch via phone.
b) Leave a voice message
   The calling party can record a voice message related to that call to express the reason of that call or to express the urgency/need of getting in touch via phone.

The input missed call data is then transmitted to the called party's telephone 104 and used to enhance the missed call notification that is displayed to the called party.

Different form known voicemail and text messaging techniques following a missed call, the missed call data is directly associated with a particular call attempt and the data sent by the calling party is received by the called party within the missed call notification of that call attempt. The missed call notification may then provide, in addition to contact name/number and time of the call, further data that provides the nature, importance or reason for the call attempt. All this data is contained in one place, the missed call notification, and there is no need for the calling party to work through all of their messages to determine if any of them require urgent attention.

The missed call data and call request are transmitted from the calling party's telephone 102 to the called party's telephone 104 over different channels. The call request is made over a first channel 106a. The first channel 106a may be either circuit switched (in case of normal CS call) or packet switched (e.g. Voice over LTE or Video over LTE calls if the user is under LTE coverage or RCS VoIP calls in case the user is under Wi-Fi or HSPA coverage). The missed call data is sent over a second channel 106b, parallel to the first channel 106a, that may is packet switched. The first and second channels 106a and 106b may respectively correspond to the first and second channels 106a and 106b as described for the first embodiment and shown in FIG. 1a.

The missed call data may be transmitted over the second channel 106b, that may be a dedicated channel, with a flag that links the missed call data to the failed call request. The called party's telephone 104 may have displayed a missed call notification, according to missed call notifications known in the art, as soon as the call attempt failed. On receiving the missed call data, the flag triggers an enhancement of the already displayed missed call notification by adding a direct display of the additional text data, in case of call note, and/or by adding a playback function for the audio file, in case of voice message, into the missed call notification. The missed call data is preferably also included, or associated, with all logs of the failed call attempt and any other missed call touch points on the user interface of the called telephone 104.

It is not essential for the missed call data to comprise a flag, and the missed call data need only comprise identification data that allows the called party's telephone 104 to associate the received missed call data with the failed call request.

Advantageously, the calling party is able to add information about the missed call to the missed call notification provided to the called party. The called party can therefore make a better decision about whether or not a missed call relates to matter that requires immediate attention.

According to a third embodiment, both the called and calling parties are provided with call logs that comprise enhanced records of their made, received and missed calls. The enhanced call records comprise additional data related to each call, such as any text or image data sent and received during a call or with a call request. The user experience is therefore greatly improved over known techniques in which the user is provided with very limited information regarding the call.

According to the third embodiment, either call or a failed call attempt occurs between a calling and called party. The call request, and voice call if the call request is accepted, are made over a first channel 106a. The first channel 106a may be either circuit switched (in case of normal CS call) or packet switched (e.g. Voice over LTE or Video over LTE calls if the user is under LTE coverage or RCS VoIP calls in case the user is under Wi-Fi or HSPA coverage). As described for the first embodiment, call data may be sent together with the call request, in parallel to the call request, over a second channel 106b that is packet switched. During a call, further call content data is transferred over the second channel 106b. The first and second channels 106a and 106b may be as described for the first and second embodiments and shown in FIG. 1a.

After a call has been completed, a call record is generated that comprises standard call details (i.e. the telephone number and the time, date and, for each accepted request, the duration of the call) in association with the call content data. A call log is generated that comprises one or more of the call records. When the calling or called party selects a call record in the call log to view, they are able to directly access the call content data without having to retrieve such data via a different process.

The call content data comprises any call data sent with a call request and may be text, image, video or any other data that the calling and called party transfer to each other, or is automatically generated, during a call. For example, the call content data may comprise data on any of:
a) Importance/subject/reason of the call
   The calling party may set the call request as important and/or the caller may add a short text explaining the reason/context of the call when making the call.
b) Location(s)
   Location data may be sent at a time when a call has been placed or shared during the call. The location(s) relative to that call can be accessed from the call record of that call.
c) Photo(s)/Image(s)
   An image, such as a photo, may be sent at the time when the call is been placed or shared during the call. In this case the image can be accessed from the call record of that call d) Data/Media
   During the call any data or media, such as contact information or video, may be shared. This can be accessed from the call record of that call.

The call content data may be stored on the telephone itself or at remote location from the mobile telephone, such as a network server. When either the calling or called party instructs their telephone to display their call log, the log displays one or more of the call records generated according to the third embodiment. The call records are selectable and, after selecting a call record, a link to the call content data is provided. Selecting the link will either retrieve the call content data from a memory of the telephone or trigger a request for the download of the call content data from a remote location.

Advantageously, the call content data is accessible by the user by tapping on the displayed call record in a call log. The visualization of all of call details and related data is provided with call back functionality maintained. Via these features the user can make use of the call records for gathering or retrieving content or data related to all of the calls, made, received and missed. The call record becomes part of the calling experience and provides an entry point to access data or to search information related to each call.

Figure 1B:
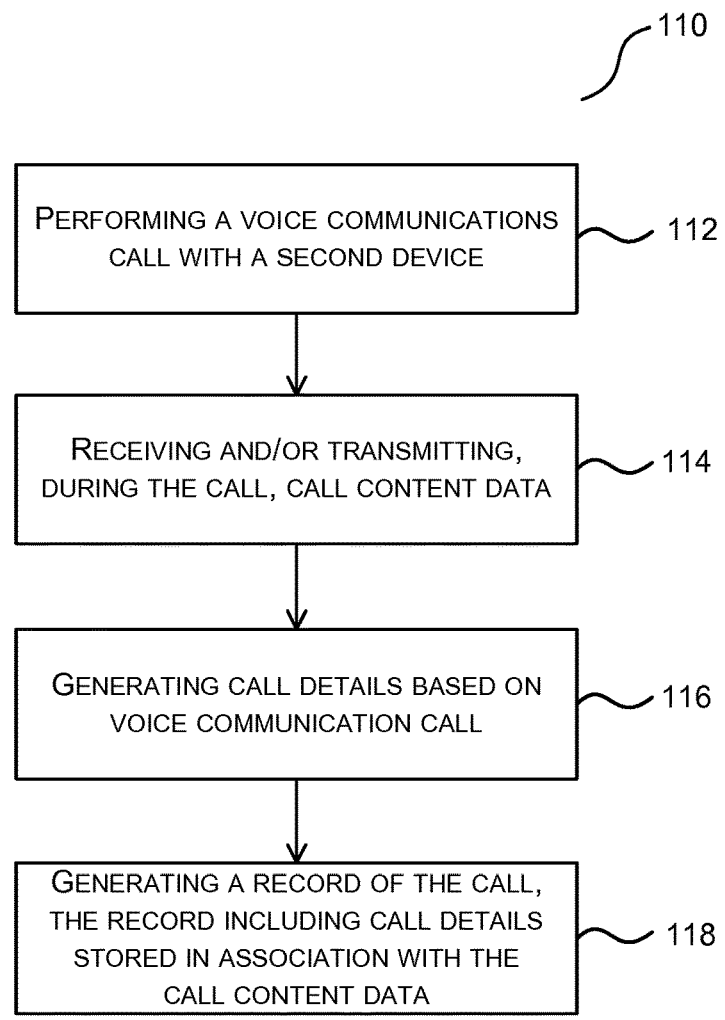
FIG. 1b is a flowchart showing a method of generating a record of a call according to embodiments.

FIG. 1b is a flow diagram of an example method 110 for generating a record of call between a first device 102 and a second device 104 during a voice communication call. The method may be performed by the first device 102 and includes the following:

At 112, the first device 102 performs a voice communications call with the second device 104 over a first communications channel 106a.

At 114, the first device 102 receives and/or transmits (or at least one of receives, transmits, or receives and transmits), during the voice communications call, call content data over a second communications channel.

At 116, the first device generates call details in dependence on the voice communications call.

At 118, the first device generates a record of the call, where the record comprises the call details stored in association with the call content data.

At 114-118, the call details may further comprise one or more of the time, date and duration of the call and the number of the second device. Additionally or alternatively, the call content data may further comprises one or more of: an indication of the importance, subject or reason for the call; location data; images; and any other data or media.

At 114-118, the call content data may be stored on the first device. Additionally or alternatively, the call content data is stored at a remote location from the first device.

The method may further include: generating a call log comprising a plurality of call records; and displaying the call log on the first device; where the call records of the call log are displayed as selectable items such that a user of the first device is able to select a call record and thereby obtain both the call details and the call content data.

The first channel 106a may be either a circuit switched channel or a packet switched channel. The second channel 106b may be either a circuit switched channel or a packet switched channel. Additionally or alternatively, the first channel 106a is a circuit switched channel and the second channel 106b is a packet switched channel. As an option, the first and second channels 106a and 106b are provided by Rich Communications Suite (RCS).

At step 112, performing the voice communications call with the second device 104 over a first communications channel 106a may further include transmitting, from the first device 102 to the second device 104, an enhanced call request including a call request and call data, where the record comprises the call details stored in association with the call request and call data.

At step 112, the call request may be transmitted over the first channel 106a and the call data may be transmitted over the second channel 106b, the first channel 106a being different to the second channel 106b.

At step 112, performing the voice communications call with the second device 104 may further include, before placing the voice communications call, inputting additional data representative of the call data, the additional data comprising one or more of: the importance of the call; one or more of subject, reason, or context of the call; a location; or an image.

Figure 2B:
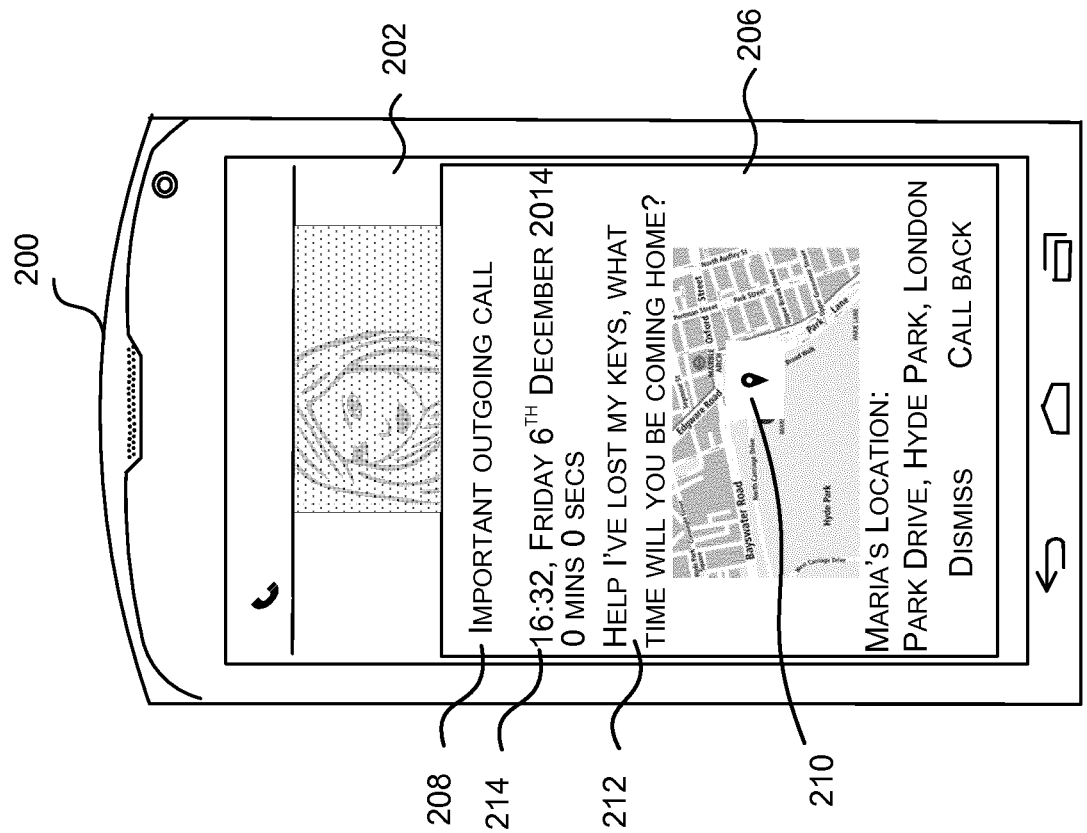
FIGS. 2a and 2b show displays on a mobile telephone according to a third embodiment.
Figure 2A:
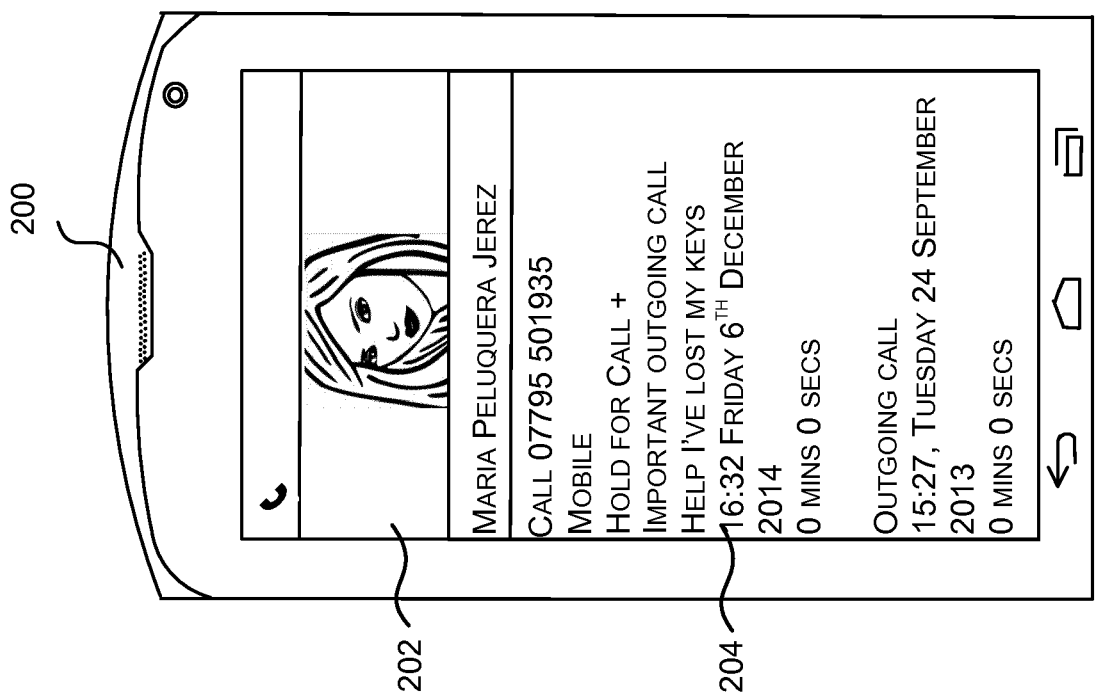

FIG. 2a shows a display 202 of a call log on a mobile telephone 200 according to the third embodiment. When the user of the mobile telephone 200 selects the call record 204 for Friday, 6 Dec. 2014, the display of the call record 206 as shown in FIG. 2b is provided. Advantageously, the user is provided with a display of the importance level 208, location 210 and text data 212 that were sent with the call request as well as the standard call details 214.

Exemplary techniques for use in implementing the first, second and third embodiments are described below.

While the first channel can be circuit switched (in case of normal CS calls) or packet switched (depending on the access network the packet switched calls can be made via Voice over LTE or Video over LTE standards if the user is under LTE coverage, otherwise made via RCS VoIP in case the user is under Wi-Fi coverage), preferably the Rich Communications Suite, RCS, is used to provide the second channel, and transfer of data over this channel, as described for the first, second and third embodiments.

RCS Release 1 was first published in December 2008. RCS was defined by the Groupe Speciale Mobile Association (GSMA), an association of telecommunications operators and related companies, with the aim of producing an umbrella of advanced communication services prioritising the interoperability of the services across network operators and handset manufacturers. RCS Release 1 established the main services and components to be used as part of RCS such as enhanced address books and chat, for example, instant messaging. RCS Release 2 was published in June 2009 and expanded Release 1 to cover Broadband Access (BA) devices such as personal computers (PCs) connected over Wi-Fi in addition to the mobile telecommunications devices supported by Release 1. Release 3, in addition to other enhancements, included functionality that advanced communication services, such as video, did not require a voice call to be initiated prior to the initiation of the advanced communication services, whereas this had been the case in previous releases.

As mentioned above, RCS defines advanced communication services for adoption. It defines the profiles and implementation for adoption of existing standardised services as defined by various standardisation bodies, such as the 3rd Generation Partnership Project (3GPP), Open Mobile Alliance (OMA) or Internet Engineering Task Force (IETF). The communication services defined by RCS include chat, file transfer, image share and video share (one-way and two-way). Other functionality defined in RCS includes enhanced address book (EAB), including service capability and social presence, network address book (NAB), including remote back-up and restore and enhanced messaging, including message history. An example of a communications service provided by RCS is two-way video sharing or video calling.

RCS defines inter-operable communications services to be adopted by network operators and mobile handset manufacturers. RCS adopts various existing standards and defines how they should be implemented. It uses the known IP Multimedia Sub-system (IMS) to provide the framework for these services. IMS is an architectural framework for delivering internet protocol (IP) multimedia services. One of the key components of IMS is the Internet Engineering Task Force (IETF) protocol Session Initiation Protocol (SIP) which is used to control multimedia communications sessions over IP.

Figure 3:
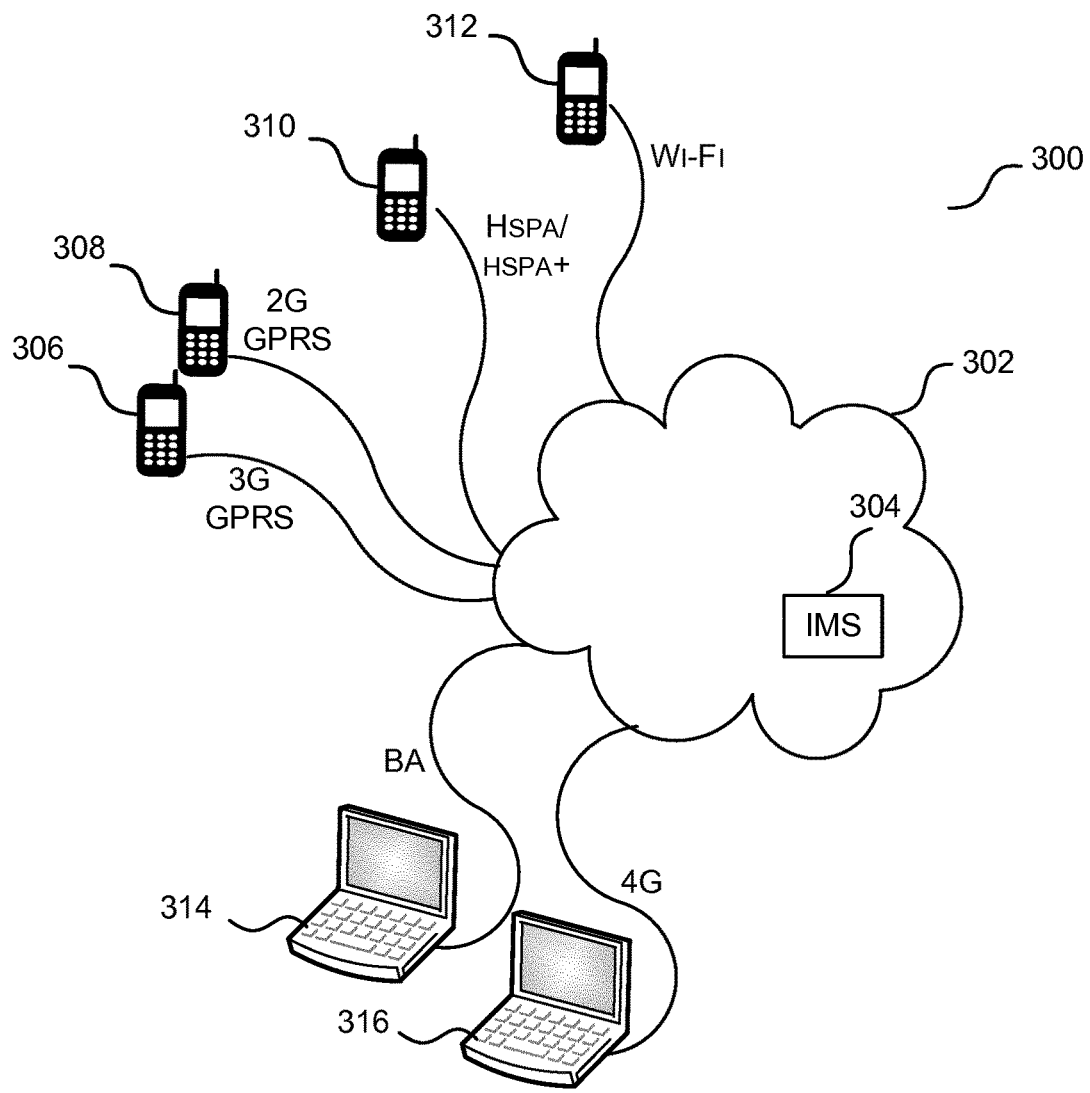
FIG. 3 shows an RCS system for use in embodiments.

FIG. 3 shows, schematically, an exemplary RCS system 300. A plurality of devices 306, 308, 310, 312, 314 and 316 may be connected to a network operator's core network 302/304 via a variety of connection methods. These may include second generation (2G) General Packet Radio Service (GPRS), 3G GPRS, HSPA/HSPA+, Wi-Fi, Broadband Access (BA) or 4G for example Wi-Max or LTE. The devices 306-316 may include any device suitable for IP communications such as a mobile telephone (e.g. smart phone), personal digital assistant, laptop equipped with a data card or laptop or PC connected over BA or Wi-Fi.

In communication with the core network 302 of the network operator is the Internet Protocol (IP) Multimedia Sub-System (IMS) 304. The IMS provides a form of Fixed-Mobile Convergence (FMC) which aids the communication of multimedia and voice applications from wireless to fixed terminals 306-316.

Figure 4A:
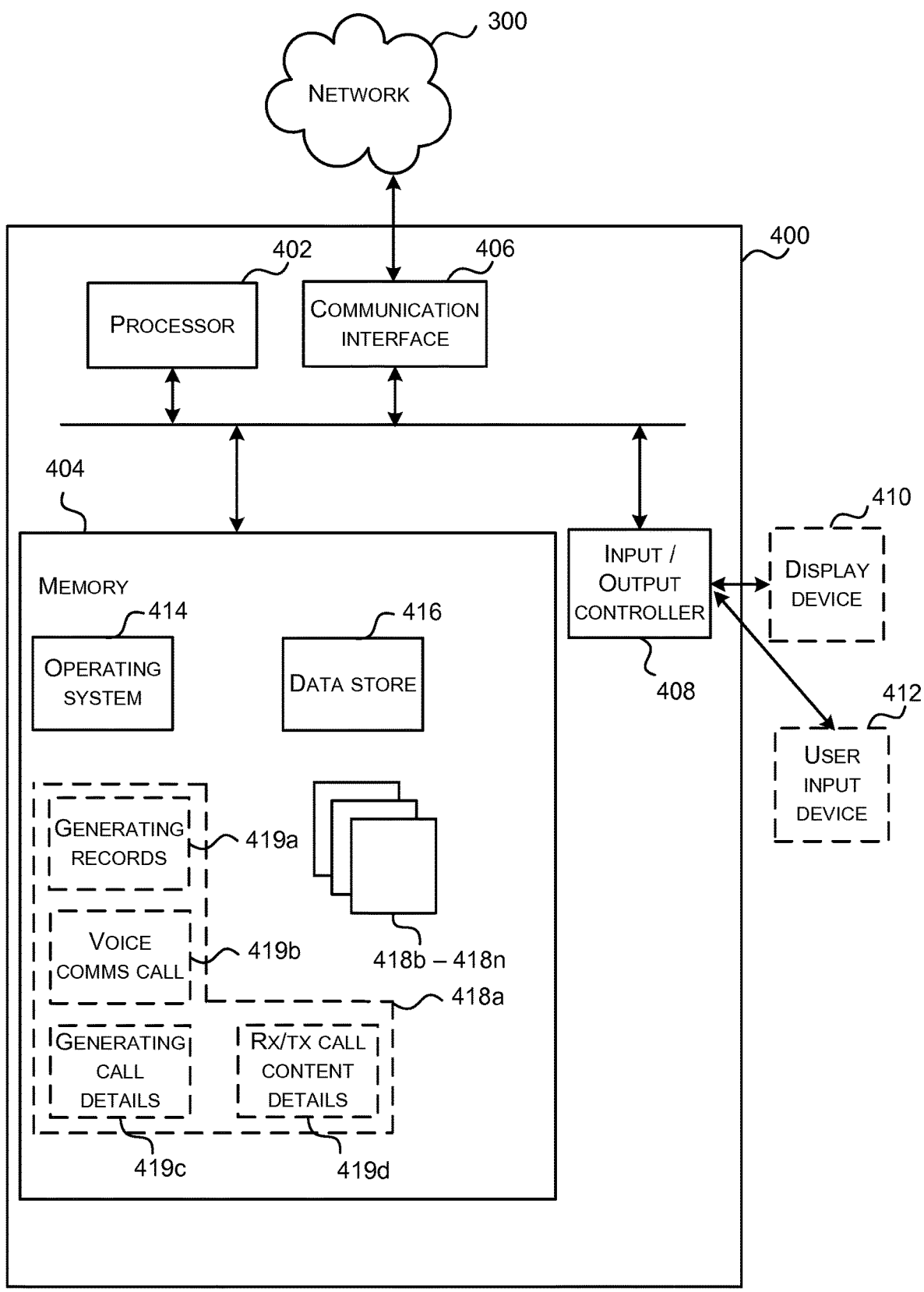
FIG. 4a is a schematic diagram illustrating a first device (e.g. a mobile telephone) according to embodiments.

FIG. 4a illustrates various components of an exemplary first device 400 (e.g. a mobile telephone, electronics device or computing-based device) which may be implemented as any form of a mobile telephone, computing and/or electronic device in which the functionality of any of the first, second, and/or third embodiments or any combination thereof or aspects as described herein may be implemented. As illustrated, first device 400 may include one or more processors 402, one or more memory units 404, communication interface 406 and input/output controller 408, where the one or more processor(s) 402 are coupled or connected to the one or more memory unit(s) 404, communication interface 406 and input/output controller 408.

First device 400 comprises one or more processor units 402 which may be microprocessors, controllers or any other suitable type of processors for processing computer executable instructions or instructions to control the operation of the device 400 in order to perform one or more of the methods and processes as described herein. For example, the operation of the device 400 may be configured to implement one or more of the method(s) as described with reference to FIGS. 1a, 1b, 2a-3 and 4b-5 or the methods as described herein. For example, the device 400 may be configured to perform generating a record of a call between a first device and a second device as described herein.

In some examples, for example where a system on a chip architecture is used, the processors 502 may include one or more fixed function blocks (also referred to as accelerators) which implement a part of the method as describe with reference to FIGS. 1a, 1b and 2a-3, 4b-5 or the methods as described herein in hardware (rather than software or firmware).

Platform software and/or computer executable instructions may be provided using any computer-readable media that is accessible by device 400. Computer-readable media may include, for example, computer storage media such as the one or more memory unit(s) 404 and communications media. Computer storage media, such as memory unit 404, includes volatile and non-volatile, removable and non-removable media implemented in any method or technology for storage of information such as computer readable instructions, data structures, program modules or other data.

The one or more memory unit(s) 404 may include platform software and/or computer executable instructions representing an operating system 414 or any other suitable platform software that may be provided at the device 400 to enable application software to be executed on the device 400. The memory unit 404 may further include a data store 416 for storing data. Depending on the functionality and capabilities of the device 400 and applications of the device 400, software and/or computer executable instructions may optionally include one or more functions and/or applications 418a-418n as described with reference to FIGS. 1a-3 and 4b-5. Applications 418a-418n may include one or more of communications functions/application(s), address book(s) or contacts application(s), call log application(s), messaging application(s), phone application(s), image gallery, music or camera application(s), game(s), multimedia application(s), social networking application(s), spreadsheets, utility applications, word processing, email, web browsers, calendars, and any other user application program configured for execution on processing unit 402, etc.

For example, application 418a may optionally (as illustrated by the dashed boxes) include computer executable instructions, which when executed on a processor 402, causes the processor 403 to perform a method of generating a record of a call between the first device 400 and a second device. The application 418a may optionally (as illustrated by the dashed boxes) include one or more of generating records functionality 419a, voice communications call functionality 419b, generating call detail functionality 419c, and receive/transmit call content detail functionality 419d, which may be provided at the device 400. Data store 416 may hold one or more record(s), call details, call content data, call data and other data associated with one or more call(s) between the first device 400 and one or more second device(s).

Computer storage media may include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 404) is shown within the device 400 it will be appreciated that the storage may be distributed or located remotely and accessed via a network 300 or other communication link (e.g. using communication interface 406).

Communication interface 406 may include, by way of example only, one or more from the group of: one or more receiver(s); one or more transmitters; or one or more receivers and one or more transmitters. For example, communication interface 406 may include one or more receivers and transmitters to enable the first device 400 to communicate with a second device over a first channel and may include one or more receivers and transmitters to enable the first device 400 to communicate with the second device over a second channel. The first and second channels may be different.

The first device 400 may also optionally or if desired comprises an input/output controller 408 arranged to output display information to a display device 410 which may be separate from or integral to the first device 400. The display information may provide a graphical user interface. The input/output controller 408 may control one or more devices or units including, but not limited to, a keypad or keypad, mouse, track pad, display screen, touchscreen display screen, or any other form of input and/or output that allows a user to use the first device 400. For example, the input/output controller 408 may be arranged to receive and process input from one or more devices, such as a user input device 412 (e.g. a mouse, keyboard, touchscreen). This user input may be used to initiate voice communications, input call data, input and share call content data, view call logs and call records, e.g. select a call log to view a call record etc. In an embodiment the display device 410 may also act as the user input device 412 e.g. it may be a touch sensitive display device. The input/output controller 408 may also output data to devices other than the display device 410, e.g. a locally connected printing device or other external display device and the like.

As an example, in essence, the first device 400 (e.g. a mobile telephone or other electronic device) includes a memory unit 404, a processor unit 402, and a communication interface 406 in which the processor unit 402 is coupled to the memory unit 404 and the communication interface 406. The memory unit 404 comprises computer code or computer executable instructions stored thereon, which when executed on the processor unit 402, causes the first device to perform a method comprising: performing, by the processor unit 402 and communication interface 406, a voice communications call with a second device over a first communications channel via network 300; at least one of receiving, transmitting, or receiving and transmitting, by the communication interface 406 during the voice communications call, call content data over a second communications channel via network 300; generating, by the processor unit 402, call details in dependence on the voice communications call; and generating, by the processor unit 402, a record of the call, where the record comprises the call details stored in association with the call content data.

The term 'device' or 'computer' is used herein to refer to any device with processing capability such that it can execute instructions. Those skilled in the art will realise that such processing capabilities are incorporated into many different devices and therefore the term 'device' or 'computer' includes PCs, servers, network nodes and other network elements, mobile telephones, personal digital assistants, electronic devices and many other devices.

RCS and IMS use the Session Initiation Protocol (SIP) protocol in order to control the multimedia communications sessions over IP defined in the suite. SIP is a text-based protocol where each transaction consists of a client request, that invokes a particular method or function on the server, and a response. Each SIP request has a method which defines its nature such as INVITE or OPTIONS. Each response contains a code combined with further information; these codes define the success or failure of the request.

Once the sessions have been initiated, other protocols may be used to facilitate communication, such as the message session relay protocol (MSRP) or Relay Transfer Protocol (RTP). MSRP is typically used in RCS for instant messaging, file transfer and image sharing while RTP is used for video sharing. For example, during a voice call, if a user wishes to share some content, a SIP INVITE request may be used which is forwarded to all capable clients in the conversation. If the user accepts the invitation, a '200 OK' response is sent. A '603' response is forwarded if the invitation is rejected. These protocols and services may be used in exemplary embodiments. However, it should be understood that any suitable protocols may be utilised to provide the described embodiments.

Figure 4B:
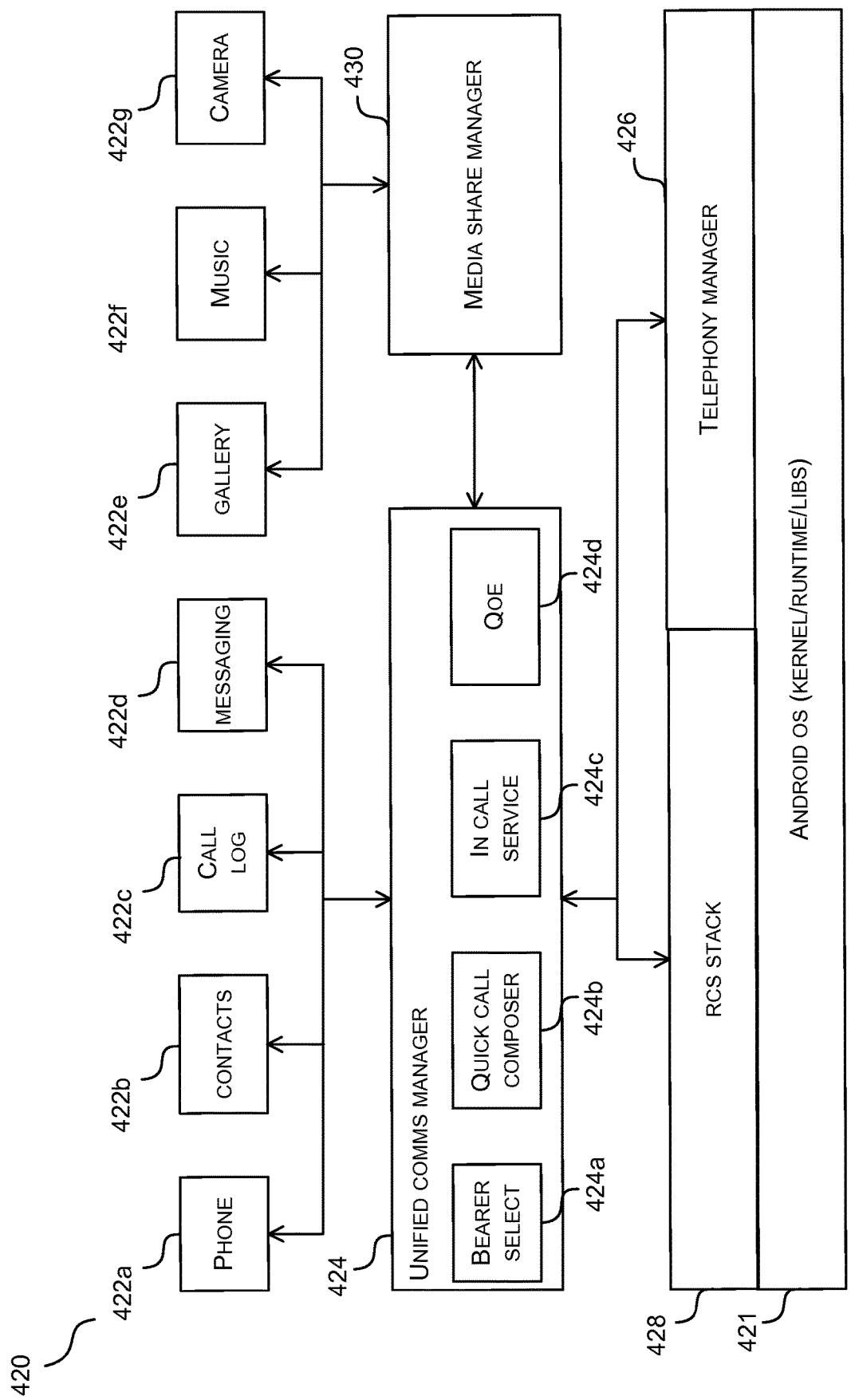
FIG. 4b shows an architecture according to an embodiment.

With regard to how RCS may more specifically be used to provide aspects of embodiments, these are described below with reference to FIGS. 4*b* and 5. FIG. 4*b* describes a specific Android implementation of the first device 400 of FIG. 4*a*, where FIG. 4*b* describes the present invention with reference to the purely exemplary Vodafone Call+ system 420 (also referred to as Call+) for providing the examples and embodiments of the invention described herein on an Android device, e.g. the operating system 414 of the first device 400 is based on the Android OS (Kernel/Runtime/Libs) 421.

FIG. 4*b* depicts the overall architecture for Vodafone Call+ system 420 using the Android OS. Default Android applications 422*a*-422*g* such as Phone 422*a*, Contacts 422*b* and Call Log 422*c* are modified according to the invention for placing enriched calls for Call+ and providing a seamless user experience. The system 420 comprises plug-in a layer Unified Communications Manager (UCM) 424 between Android Phone Applications 422*a*-422*d* and Android Telephony Manager 426 for routing CSNoIP calls. UCM 424 routes calls through either Telephony Manager 426 (Circuit Switched, CS calls) or RCS stack 428 (IP calls). RCS stack 428 provides all the capabilities for all RCS-based services needed for Call+ use cases. RCS stack 428 provides Joyn compliant APIs towards North bound interface and the same can be used by the UCM 424 to interface with the RCS stack 428.

UCMs 424 provides an interface to the modified Android Phone Application 422*a* to make or accept calls (CS or IP). UCM 424 dynamically decides whether to route the call through RCS stack 428 for IP call or Android Telephony Manager 426 for normal CS call. UCM 424 also provides functionalities to support different Call+ use cases like Quick Call Composer 424*b* and other in call services 424*a* and 424*c*-424*d*. The UCM 424 has the following functions:

1. Bearer Selection 424*a*—UCM 424 is responsible for selecting the bearer path for a particular call based on different criteria. The UCM 424 also provides an option to Phone Application 422*a* through which user can override the selection of bearer. The bearer selection may be done based on the user setting through a master switch available in the system 420. The UCM 424 may alternatively be enhanced to make the bearer selection based on certain defined criteria such capabilities of the remote party, availability of a particular bearer type, available signal strength and/or data speeds.

2. Quick Call Composer 424*b*—The UCM 424 provides an interface to the Android Phone Application 422*a* for making enriched RCS calls, i.e. calls and call requests according to the embodiments described herein. Phone App 424*a* passes various parameters like importance of the call, subject, location and image while making a call in case user wants to make an enriched call. The UCM 424 keeps this data and uses it to invoke various services provided by RCS stack 428 for making enriched calls. UCM 424 creates an eXtensible Markup Language (XML) output of the user provided data and sends this XML output to a remote party. The image is uploaded to a content server and the uniform resource locator (URL) at server is used in the XML output sent to the remote party.

3. In Call Services 424c—UCM 424 is responsible for providing all the in-call services like image share, video share, file transfer etc. UCM 424 performs the capability discovery using RCS stack 428 and provide this information to upper layer applications which in turn show available options to the user. UCM 424 provide APIs and notification to the Phone Application 422a to perform in-call services. FIG. 5 shows an example of communication flows 500 for an outgoing in-call Image Share feature:

4. Quality Of Experience 424d—The UCM 424 is responsible for collecting and providing the Call Quality Key Performance Indicators (KPIs) to the application. The UCM 424 collects the following KPIs which are an indication of a user's Quality of Experience: packet loss (TX/RX), jitter (TX/RX), bandwidth utilization.

In the Call+ application context, the objective of the Media Share Manager 430 is to enable a user to share the media with other users during the call or otherwise. To enable Call+ application to use as a content sharing application, Sharing intent is implemented as part of Media Share Manager 430. Any Android application that wants to share the content will show Call+ as an option. Android default media applications are: Gallery 422e, Camera 422g and Music 422f.

The default gallery application 422e provides interfaces (Intents) for other applications to choose an image and use the same accordingly. It also uses ShareActionProvider to show the list of applications that can be used for sharing. Media Share Manager 430 registers Intent for sharing which will add Call+ in the list of available options when user selects share option in Gallery application 422e.

The default camera application 422g also provides interfaces (Intents) so that other application can invoke it and use it to capture image or video. Media Share Manager 430 will also use the same intent to use camera application 422g for sharing the content.

The default music application 422f does not provide any way to share the music and hence the application is extended with the sharing feature of Android.

RCS stack 428 is a RCS-e compliant stack, which provides Joyn compliant interfaces towards the upper layer application. It provides the following RCS features:
  IP Voice and Video Call
  Enhanced Address Book
  Network Address Book via SyncML;
  Image and Video Share;
  Chat and Group Chat;
  File Transfer;
  Multi-device support UCM 424 uses the Joyn APIs provided by the RCS SDK, to interface with the RCS stack 428 for supporting Call+ use cases for IP voice calls, in-call, image and video sharing, location sharing etc.

Vodaphone Call+ applications for implementing the invention may consist of, by way of example only but not limited to, following subcomponents:
  handling Call+ initiation (CallBuilder+)
  selecting and sending Call+ data (CallData+)
  receiving and viewing the data (CallView+)
  Call+ notifications (CallNotifier+).

CallData+ and CallView+ are related to Quick Call Composer 424b.

CallBuilder+ subcomponent allows user to create options for the new call (add file to share, video, photo, location, call importance, message, other contacts etc.) and start the call or conference. For example, this subcomponent may implement at least part of performing a voice communications call with a second device over a first communications channel.

CallData+ subcomponent allows a user to select data (shared files, video, messages, location, etc.) for the current call. For example, this subcomponent may implement at least part of receiving and/or transmitting, during the voice communications call, call content data over a second communications channel.

CallView+ subcomponent allows a user to see and select (manipulate with) data (shared files, video, messages, location, status of the caller, etc.) that are received from another call-end. For example, this subcomponent may implement at least part of generating call details independence on the voice communications call. In addition, this subcomponent may implement at least part of generating a record of the call, where the record comprises the call details stored with the call content data. For example, this subcomponent may implement at least part of displaying the call log on the first device, where the call log is displayed as selectable items, where the user of the first device may select a call record and thereby obtain both the call details and the call content data.

CallNotifier+ subcomponent is activated from the Android status bar and allows a user to see Call+ notifications and information (missed calls, call info, history, etc.). For example, this subcomponent may implement at least part of displaying the call log on the first device, where the call log is displayed as selectable items, where the user of the first device may select a call record and thereby obtain both the call details and the call content data.

The applications 422a-422d may be modified as follows:
  Contacts Application 422b
    Visual element is added that activates the CallBuilder+.
    Visual element is added that indicates the Call+ availability of the selected contact.
  Phone Application 422a
    Visual element is added that activates the CallData+ to select and send data to the caller(s).
    Visual element is added to indicate that new data has been received and activate CallView+ to preview, open and manipulate the data.
    Visual elements are added to indication of the Call+ status.
    Visual elements are added to indicate, preview, answer or reject Call+ when receiving the call (in-call).
  Messaging Application 422d
    Visual element is added that activates the CallBuilder+.
    Visual element is added that indicates the Call+ availability of the selected contact.
  Launcher (Home Screen)
    Minor updates to implement calling technology indication and some master switch widget for end-to-end call technology are provided.

With regard to Call+ and Android integration, Call+ features are entwined within the Android framework and Android Native applications. The integration is achieved by:
  1. Phone application 422a UI supporting In-call features
  2. The new layer, i.e. UCM 424, between the Phone UI and Telephony Manager 426.
  3. The UCM 424 layer having the logic to select the bearer (VoIP or CS Voice).
  4. Various modification of other default applications like directory, call log 422c, music 422g to support Call+ features.

5. Call+ being the default Android phone application 422*a*.

Although the Android implementation and architecture is described herein with reference to, but not limited to, specific Android applications, kernel, libraries, functions, layers and/or subcomponents and/or combinations thereof, this is by way of example only, and it is to be appreciated by the skilled person that any suitable operating system, framework and/or related applications are applicable, e.g. Windows or Apple iOS etc., for implementing the invention as described. Although the Vodafone Call+ system 420 is described with reference to, but not limited to, specifically named applications, functions and/or subcomponents and combinations thereof, this is by way of example only, and it is to be appreciated by the skilled person that the specific applications, functions and/or subcomponents and/or combinations thereof as described and named herein can be implemented in any other way suitable for implementing the invention as described herein.

Figure 5:
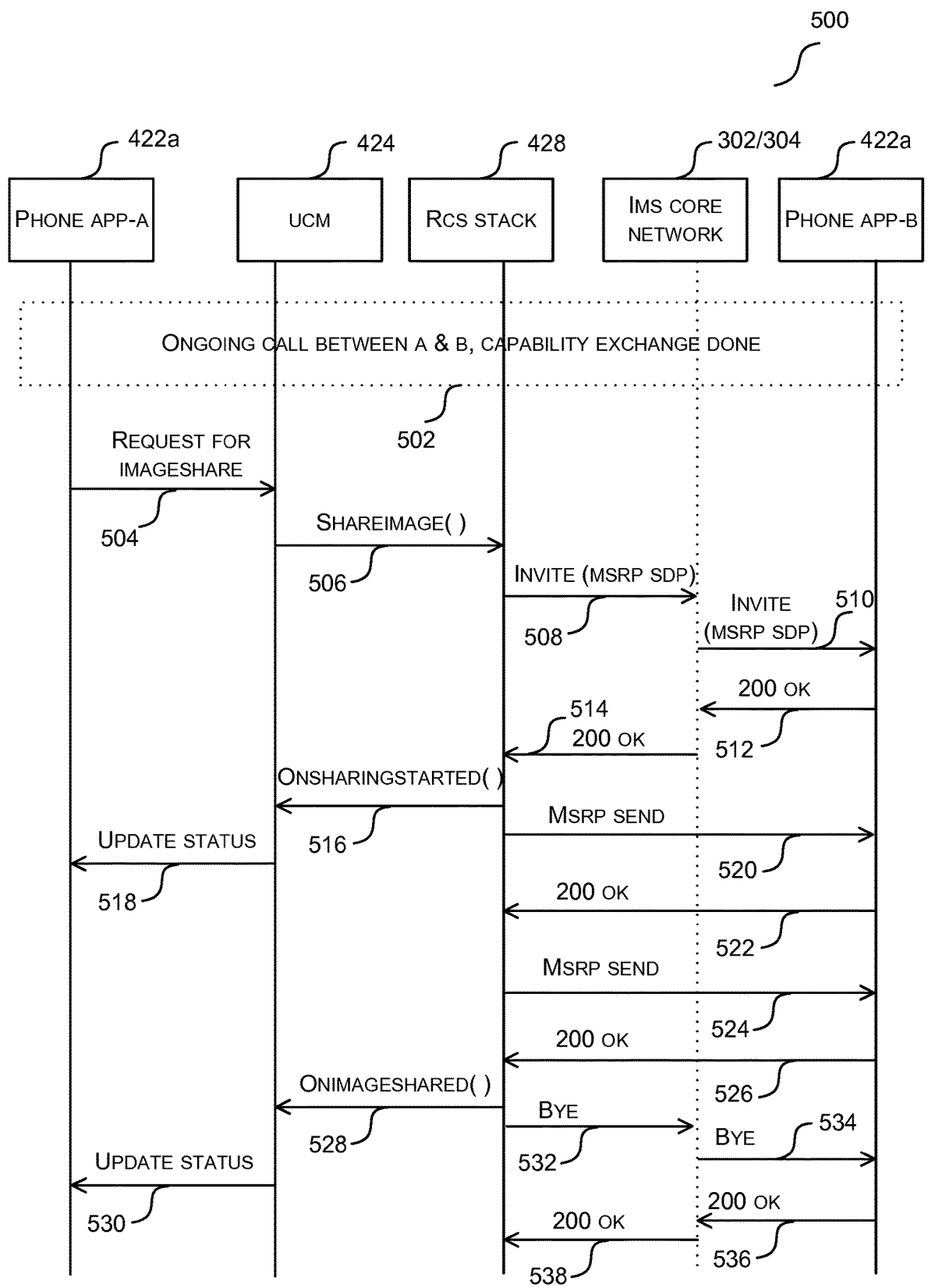
FIG. 5 shows communication paths according to an embodiment.

FIG. 5 is a signalling flow diagram according to an embodiment showing the communication flows 500 for an outgoing in-call image share feature, where the call content exchanged on the second channel is an image. At 502, there is an ongoing call, e.g. a voice communications call, between a first device (e.g. A) and a second device (e.g. B). In this example, a capability exchange has been performed and both devices know the capability of the other device that enables an image to be shared between the first and second devices.

At 504, the phone application 422*a* of the first device sends a Request for ImageShare message towards the second device. The UCM 424 of the first device receives the Request for ImageShare message, and in response, at 506, sends a ShareImage( ) towards the RCS stack 428. The ShareImage( ) includes the image to be shared. On receiving the ShareImage( ) message, the RCS stack 428 at 508 sends an Invite(MSRP SDP) message towards the second device, which is routed at 510 via the IMS Core Network 302/304 to the phone application 422*a* of the second device.

At 512 and 514 a SIP message (200 OK) is send to the RCS Stack via the IMS Core network 302/304. At 516, the RCS Stack 428, in response to receiving the 200 OK message, triggers image sharing and the RCS Stack 428 transmits the OnSharingStarted( ) message towards the phone application 422*a* of the first device via the UCM 424. At 518, the UCM 424 sends an Update Status message to the phone application 422*a* of the first device indicating that images can be shared between the first and second devices.

At 520-526, the image is shared from the first device to the second device. In this case, at 520 and 524, the RCS stack 428 shares the image with the second device using MSRP Send messages. At 522 and 526, the second device acknowledges receipt of the image data using 200 OK messages sent via the RCS stack 428.

In 528, the RCS stack 428 has finished transmitting the image data and sends an OnImageShared message towards the UCM 424, which sends, at 530, an update status message to phone application 422*a* of the first device to indicate the image has been shared.

At 532-538, the RCS stack 428 terminates the image sharing with the second device by sending, at 532, BYE messages via the IMS core network 300/302. At 536, the second device sends acknowledge messages, e.g., a 200 OK message, to the IMS Core network 300/302, which relays the 200 OK messages, at 538, to the RCS stack 424. This terminates the image share between first and second devices.

A number of modifications and variations can be made to the above-described embodiments. It will be understood that the benefits and advantages described above may relate to one embodiment or may relate to several embodiments. The embodiments are not limited to those that solve any or all of the stated problems or those that have any or all of the stated benefits and advantages.

The techniques of any of the first, second and third embodiments may be applied in combination with each other so that the user experience, of both the calling and called parties, is improved during all of the sending of call requests, the display of missed call notifications and the viewing of call records.

In a particularly preferred implementation, the first channel is circuit switched (in case of normal CS calls) or packet switched (depending on the access network the packet switched calls can be made via Voice over LTE or Video over LTE standards if the user is under LTE coverage, otherwise made via RCS VoIP in case the user is under Wi-Fi coverage). In another particularly preferred implementation, the second channel packet switched.

Embodiments refer to telephones of the calling and called parties. These may be any type of mobile telephone, such as a smart phone, or communications device capable of providing both voice and data communications.

It will be understood that the exemplary embodiments described herein may be implemented over data only links, in combination with voice or as standalone services. In addition, the features described may be implemented in conjunction with known user experience models and communication services. Although the present invention has been described in terms of specific services, it will be understood that any services and communication methods will be suitable for use with the principles of the present invention. Services may be defined in the future that will be equally applicable with the embodiments described herein.

The embodiments described herein may be implemented on any device operating system. It will be understood that the key service logic is described and that the skilled person may implement these features differently when presenting them to the user. The processes described herein may be automated or may be performed upon manual instruction.

Any reference to an item refers to one or more of those items. The term 'comprising' is used herein to mean including the method blocks or elements identified, but that such blocks or elements do not comprise an exclusive list and a method or apparatus may contain additional blocks or elements.

While terminals are often referred to as "mobile" in the preceding discussion the term "mobile" should not be construed to require that a terminal always be mobile, merely that it has the capability of being in communication with a wireless telecommunications network or IP network, depending on the context, which allows mobility. For instance, a PC terminal or an machine to machine (M2M) client that has never moved from any particular geographic location may in a sense be considered mobile as it could be moved to a different location while still accesses the same network. The term "mobile terminal" is used in the present discussion just to be read as including the possibility of a terminal that is "semi-permanent" or even "fixed" where the context does not contradict such an interpretation.

Additionally, the "network" in the preceding discussion should be thought of as having at least a wireless element and, typically, internet protocol (IP) elements.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples or embodiments described above may be combined with aspects of any of the other examples described to form further examples without losing the effect sought.

The processes described herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method for facilitating telecommunications between a first device and a second device by supplementing the telecommunications with additional call content data representative of one or more determined characteristics associated with the telecommunications, the method being performed by the first device and comprising:
   prior to a call request leaving the first device over a first communications channel and being delivered to the second device to initiate a voice communications call, at least one of receiving, transmitting, or receiving and transmitting call content data over a second communications channel, wherein:
      the call content data includes information representative of one or more characteristics associated with the voice communications call, and
      the call content data is transmitted to the second device in advance of the call request being received by the second device;
   only after the call content data is transmitted to and received at the second device, transmitting the call request to the second device to establish the voice communications call with the second device;
   generating call details in dependence on the voice communications call;
   generating a record of the call, wherein the record comprises the call details stored in association with the call content data; and
   displaying a call log on the first device, the displayed call log displaying the record of the call, wherein the record of the call is selectable and, when selected, a link to the call content data is provided, wherein selection of the link either retrieves the call content data from a local memory or triggers a request to download the call content data from a remote location.

2. The method according to claim 1, wherein the call details comprise one or more of a time, a date, a duration of the voice communications call, or a number of the second device.

3. The method according to claim 1, wherein the call content data comprises one or more of:
   an indication of an importance, a subject or a reason for the voice communications call;
   location data;
   one or more images; or
   other data or media associated with the voice communications call.

4. The method according to claim 1, wherein the call content data is stored on the first device.

5. The method according to claim 1, wherein the call content data is stored at a remote location from the first device.

6. The method according to claim 1, further comprising:
   generating the call log, which comprises a plurality of call records, including said record of the call; and
   displaying the call log on the first device.

7. The method according to claim 1, wherein the first channel is either a circuit switched channel or a packet switched channel.

8. The method according to claim 1, wherein the second channel is either a circuit switched channel or a packet switched channel.

9. The method according to claim 1, wherein the first channel is a circuit switched channel and the second channel is a packet switched channel.

10. The method according to claim 9, wherein the first and second channels are provided by Rich Communications Suite (RCS).

11. The method according to claim 1, wherein the method further includes:
   performing the voice communications call with the second device over the first communications channel by transmitting, from the first device to the second device, an enhanced call request comprising the call request and the call content data,
   wherein a record comprises the call details stored in association with the call request and the call content data.

12. The method according to claim 11, wherein the call request is transmitted over the first channel and the call content data is transmitted over the second channel, the first channel being different to the second channel.

13. The method according to claim 11, wherein performing the voice communications call with the second device further comprises, before placing the voice communications call, inputting additional data representative of the call data, the additional data comprising one or more of:
   an importance of the voice communications call;
   one or more of subject, reason, or context of the voice communications call;
   a location; or
   an image.

14. A mobile telephone comprising a memory unit, a processor unit, a communication interface, the processor unit coupled to the memory unit, and the communication interface, wherein the memory unit comprises instructions stored thereon, which when executed by the processor unit, causes the mobile telephone to perform a method for facilitating telecommunications between the mobile telephone and a second device by supplementing the telecommunications with additional call content data representative of one or more determined characteristics associated with the telecommunications, the method comprising:

prior to a call request leaving the mobile telephone over a first communications channel and being delivered to the second device to initiate a voice communications call, at least one of receiving, transmitting, or receiving and transmitting, by the communication interface, call content data over a second communications channel, wherein:

the call content data includes information representative of one or more characteristics associated with the voice communications call, and the call content data is transmitted to the second device in advance of the call request being received by the second device;

only after the call content data is transmitted to and received at the second device, transmitting the call request to the second device to establish the voice communications call with the second device;

generating, by the processor unit, call details in dependence on the voice communications call;

generating, by the processor unit, a record of the call, wherein the record comprises the call details stored in association with the call content data and displaying a call log, the displayed call log displaying the record of the call, wherein the record of the call is selectable and, when selected, a link to the call content data is provided, wherein selection of the link either retrieves the call content data from a local memory or triggers a request to download the call content data from a remote location.

15. A tangible computer readable medium comprising computer program code to configure a first device to perform a method for facilitating telecommunications between the first device and a second device by supplementing the telecommunications with additional call content data representative of one or more determined characteristics associated with the telecommunications, the method comprising:

prior to a call request leaving the first device over a first communications channel and being delivered to the second device to initiate a voice communications call, at least one of receiving, transmitting, or receiving and transmitting call content data over a second communications channel, wherein:

the call content data includes information representative of one or more characteristics associated with the voice communications call, and the call content data is transmitted to the second device in advance of the call request being received by the second device;

only after the call content data is transmitted to and received at the second device, transmitting the call request to the second device to establish the voice communications call with the second device;

generating call details in dependence on the voice communications call;

generating a record of the call, wherein the record comprises the call details stored in association with the call content data; and displaying a call log on the first device, the displayed call log displaying the record of the call, wherein the record of the call is selectable and, when selected, a link to the call content data is provided, wherein selection of the link either retrieves the call content data from a local memory or triggers a request to download the call content data from a remote location.

* * * * *